United States Patent
McClellan, Sr. et al.

[15] 3,691,525
[45] Sept. 12, 1972

[54] VEHICLE SPEED INDICATOR SYSTEM

[72] Inventors: Rudolph M. McClellan, Sr.; Rudolph M. McClellan, Jr., both of 1622 Crestdale, Houston, Tex. 77055

[22] Filed: May 27, 1971

[21] Appl. No.: 147,526

Related U.S. Application Data

[62] Division of Ser. No. 786,291, Dec. 23, 1968, Pat. No. 3,597,730.

[52] U.S. Cl.........................................340/62, 73/499
[51] Int. Cl. .................................................B60q 1/54
[58] Field of Search................340/31, 32, 34, 52, 62; 180/98; 73/499, 507, 518

[56] References Cited

UNITED STATES PATENTS 3,229,249  1/1966  Brenner..................340/62 X
3,521,232  7/1970  Black..........................340/62

*Primary Examiner*—Alvin H. Waring
*Attorney*—Donald Gunn

[57] ABSTRACT

A vehicle speed indicating system comprises indicating lamps mounted on the vehicle and operated in a predetermined pattern to indicate the speed of the vehicle to those remote therefrom.

9 Claims, 10 Drawing Figures

RUDOLPH M. McCLELLAN SR.
RUDOLPH M. McCLELLAN JR.
INVENTOR.

BY   Donald Gunn
    ATTORNEY

PATENTED SEP 12 1972

| MPH | Y | G1 | G2 | G3 | R |
|---|---|---|---|---|---|
| 0-10 | 0 | 0 | 0 | 0 | 0 |
| 11-20 | 1 | 0 | 0 | 0 | 0 |
| 21-25 | 1 | 1 | 0 | 0 | 0 |
| 26-30 | 0 | 1 | 1 | 0 | 0 |
| 31-35 | 1 | 1 | 1 | 0 | 0 |
| 36-45 | 0 | 1 | 1 | 1 | 0 |
| 46-55 | 0 | 1 | 1 | 1 | 0 |
| 56-65 | 0 | 1 | 1 | 1 | 1 |
| 66-UP | * | * | * | * | * |

TABLE 2

| MPH | Y | G | R |
|---|---|---|---|
| 0-9 | 0 | 0 | 0 |
| 10-19 | 1 | 0 | 0 |
| 20-29 | 0 | 1 | 0 |
| 30-39 | 1 | 1 | 0 |
| 40-49 | 0 | 0 | 1 |
| 50-59 | 1 | 0 | 1 |
| 60-69 | 0 | 1 | 1 |
| 70-79 | 1 | 1 | 1 |
| 80-UP | * | * | * |

TABLE 1

\* = ON FLASHING   1 = ON   0 = OFF   Y = YELLOW   G = GREEN   R = RED

RUDOLPH M. McCLELLAN, Sr.
RUDOLPH M. McCLELLAN, Jr.
INVENTOR.

BY   Donald Gunn
ATTORNEY

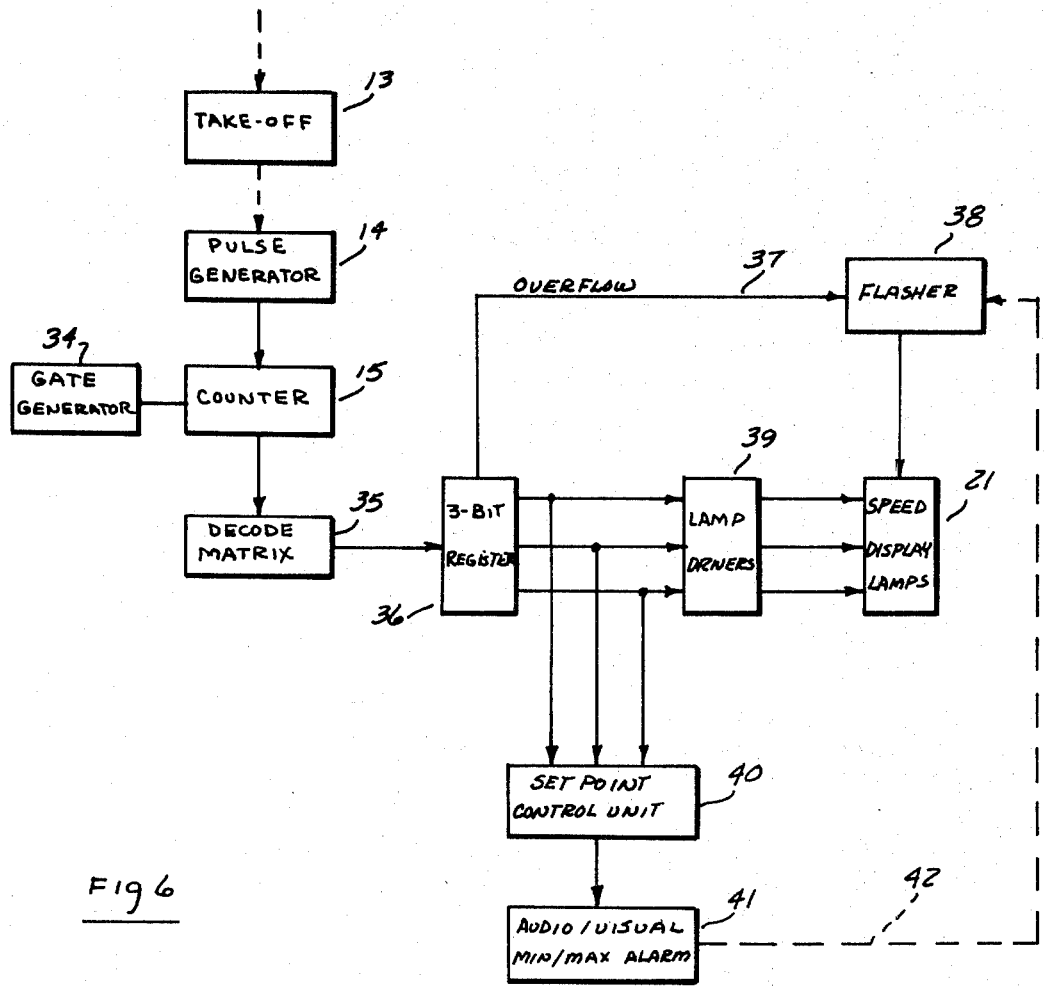

VEHICLE SPEED INDICATOR SYSTEM

RELATED APPLICATIONS

Applicants are the inventors of co-pending application Ser. No. 786,291, filed Dec. 23, 1968, now U.S. Pat. No. 3,597,730 bearing the same title, of which this is a divisional application.

SUMMARY OF PROBLEM AND SOLUTION

Control of the speed of automobiles, trucks, and other moving vehicles is today strictly within the province of the driver, who relies on and acts in accordance with the information presented by the speedometer. A currently available accessory on some vehicles is a warning buzzer into which the operator manually sets a desired maximum speed. Some truck lines utilize monitors in which a strip chart recorder forms a permanent, recallable record of the speed of the vehicle. Thus, speed control is totally within the province of the operator or those in view of the speedometer, whereas those outside the vehicle can only guess the speed of the vehicle. This ignorance on the part of observers has given rise to the law enforcement technique of using timing clocks, trailing cars or aircraft, and doppler radar. Current law enforcement techniques are self-limiting in application, clearly.

Quite often, parties on or near a roadway must estimate the speed and acceleration of another vehicle and whether or not a vehicle is in the process of acceleration or de-acceleration. This is typically true for all oncoming or passing vehicles when encountering another vehicle. Such estimates are, in fact, guesses based merely on the experience of the operator, and his ability to guess accurately. This is clearly a limitation on his manuverability, and moreover, is often a point of great contention in court cases involving collisions between moving vehicles. Typically, the estimate of speed of one driver of that of another vehicle is not admissible evidence since it is only an estimate, and is not properly validated opinion testimony.

Subconsciously, most drivers are particularly alert to proper speed limits only if they feel or sense nearby law enforcement authorities. It is proper conjecture that the device of the present invention will make drivers particularly alert to their own speed and tend to encourage drivers to remain within the speed limits based on the premise that if a driver knows that his speed is displayed, not only by the speedometer, but to those in other vehicles, pedestrians, bystanders, and the like, he will remain within the legal speed limits. In recognition of the fact that most automobile fatalities involve speeding, the device of the present invention is intended as a safety device. It is summarized as providing an apparatus which externally displays the speed and acceleration of a vehicle in a form which is readable or discernable by another located some distance from the vehicle. Through the use of coded lamps of appropriate colors, a person some distance from the vehicle is furnished sufficient information to gauge the speed and acceleration of the vehicle.

Therefore, one object of the present invention is to provide an externally visible continuous indication of the vehicle speed to observers.

Another object of the present invention is to provide a new and improved visual and audio alarm system which warns the driver that he is not within the legal speed limits.

Yet another object of the present invention is to provide speed indicating apparatus which is calibrated and adjusted to a variety of circumstances.

Another object of the present invention is to instantly alert a trailing driver that a forward vehicle is in a process of accelerating or de-accelerating.

An important object of the present invention is to increase the traffic capacity of highways and streets because the vehicles travel closer, albeit safer, to one another and avoid "bunching."

Another important object of the present invention is to provide new and improved speed indicating apparatus adapted to be mounted for a view fore, aft and above a moving vehicle to yield binary coded speed indications.

A further object of the present invention is to permit pilots of flying police patrol aircraft to monitor road traffic more effectively and to easily detect speed violators by observance of speed indication means seen on the roof of moving vehicles below.

Other objects and advantages of the present invention will become more readily apparent from a consideration of the included specification and drawings, wherein.

Figure 5:
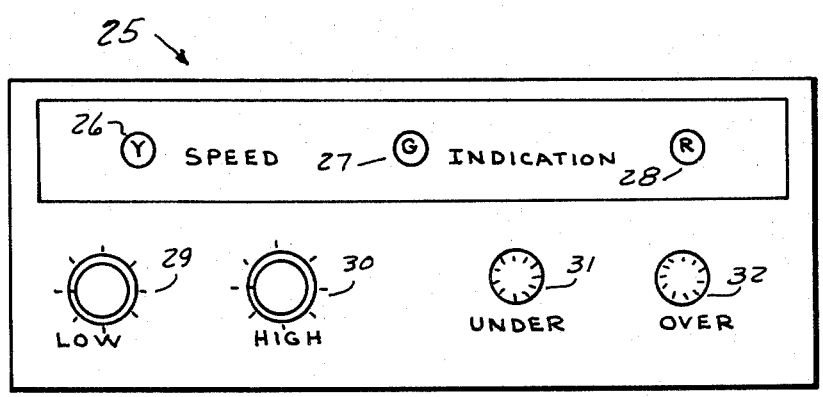
Figure 7:
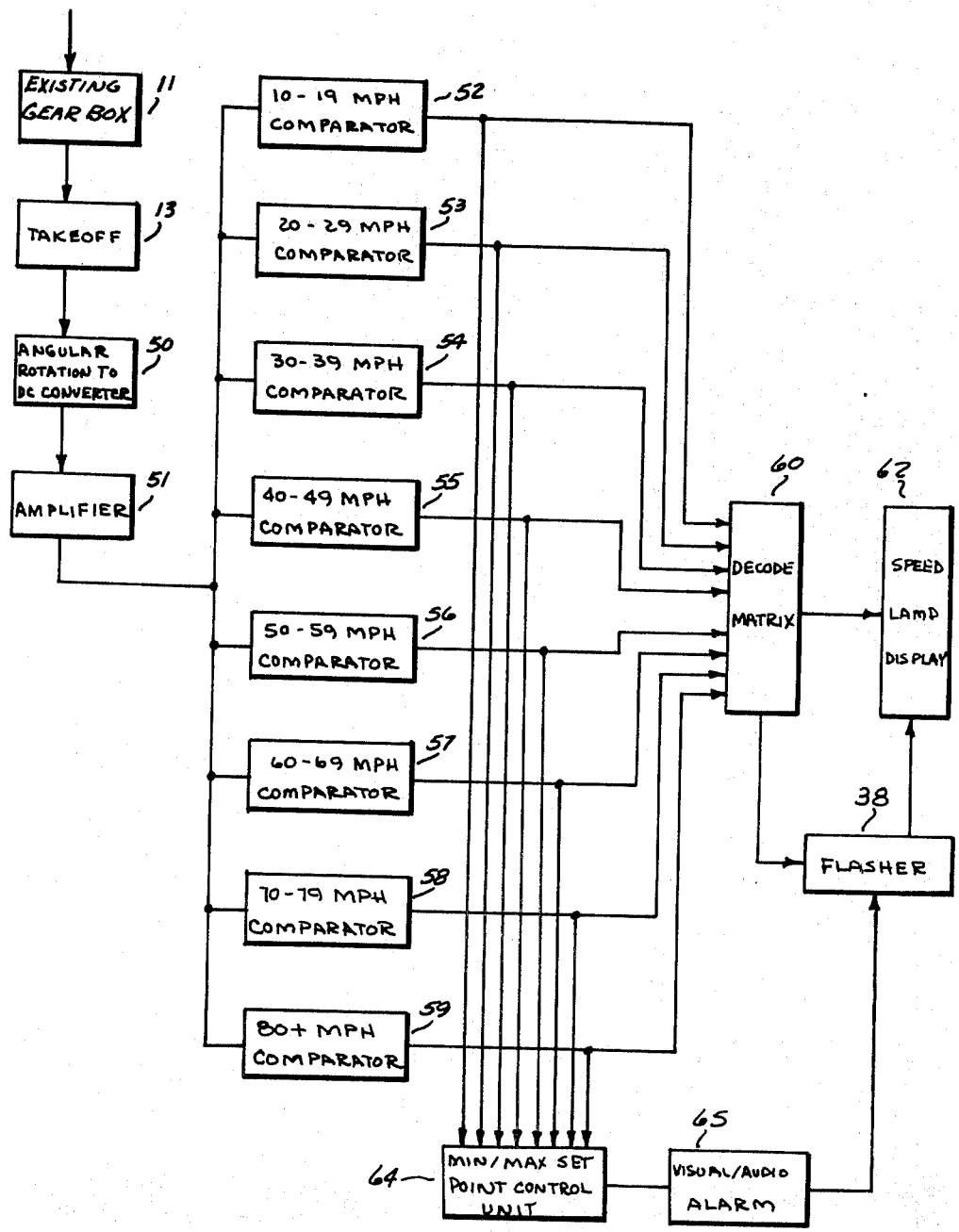
Figure 8:
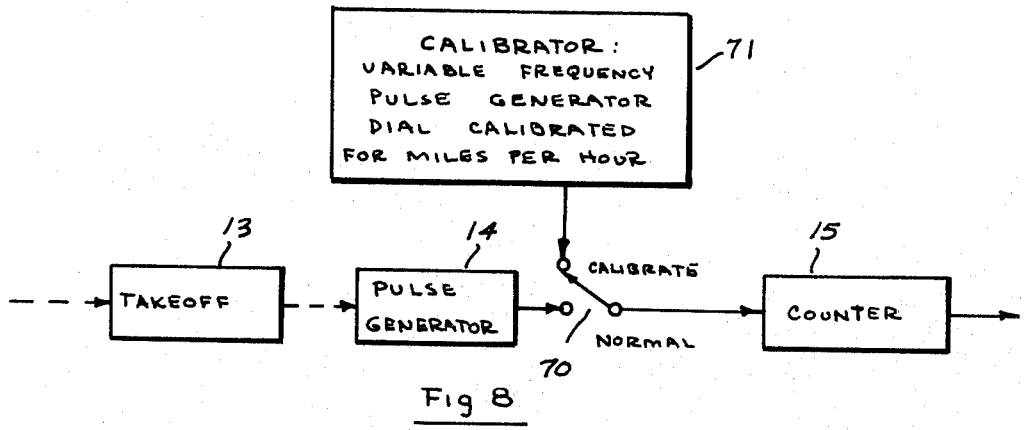
Figure 9:
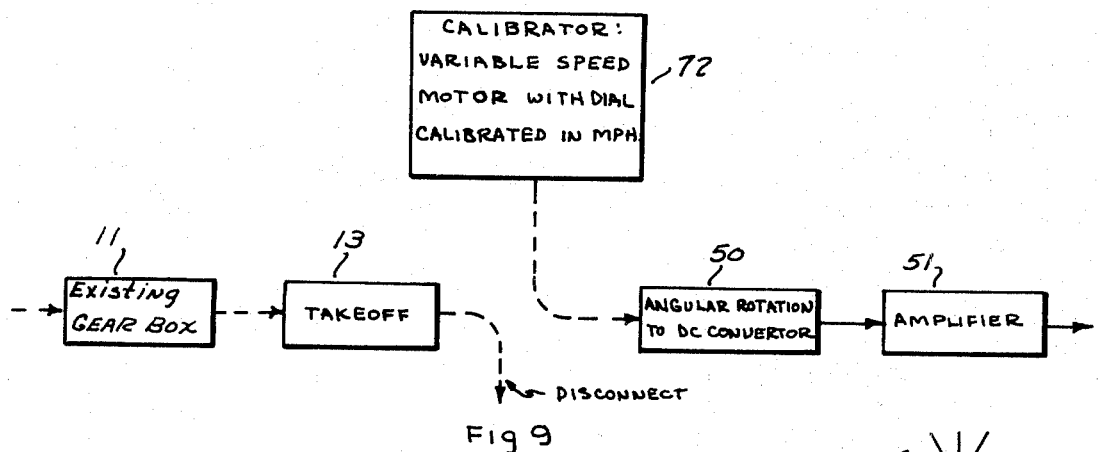
Figure 10:
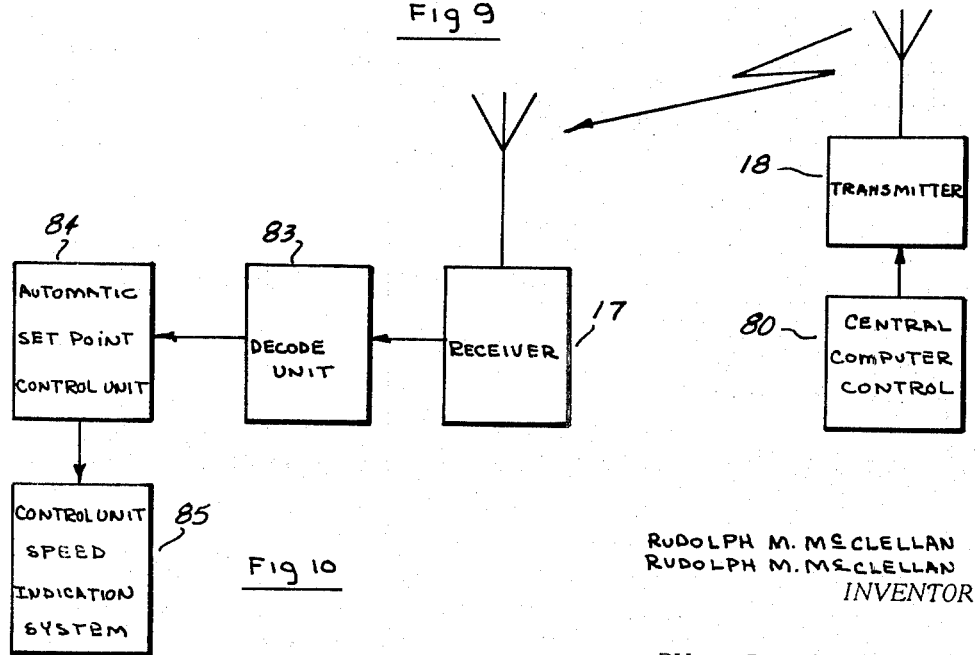

Table 1 is a chart of indicating codes for various speeds for one embodiment of indicating apparatus;

Table 2 is a chart of indicating cod-s for an alternative embodiment of apparatus;

FIG. 5 is one form of a panel installed in the vehicle;

FIG. 6 is a schematic block diagram of an apparatus providing warning signals utilizing digital techniques;

FIG. 7 is a schematic block diagram of analog circuitry for indicating speed of the vehicle;

FIG. 8 is a schematic block diagram of calibration apparatus alternatively installed with the present invention;

FIG. 9 is an alternative calibration apparatus to that of FIG. 8; and,

FIG. 10 is a schematic block diagram of apparatus cooperative with master traffic control systems whereby vehicles are provided with selected speed information.

Figure 1:
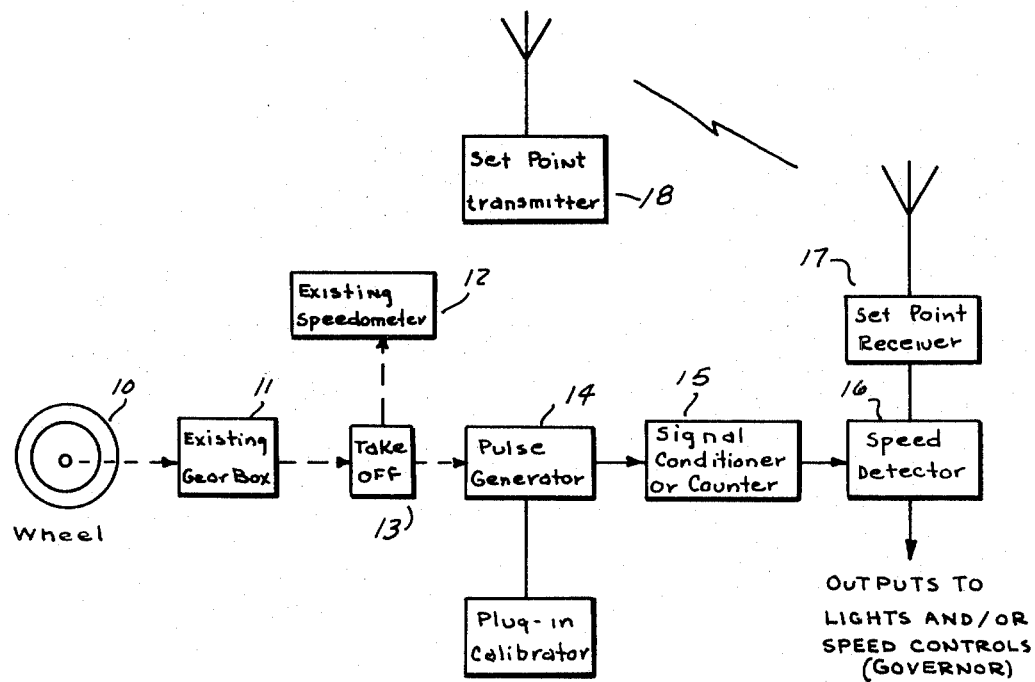
FIG. 1 is a schematic block diagram of the speed indicating apparatus of the present invention, including calibration apparatus.

Attention is first directed to FIG. 1 of the drawings. FIG. 1 is a schematic block diagram of apparatus to be installed with a vehicle. In FIG. 1, the vehicle is presumed to have a wheel 10 which rotates at the speed of the vehicle. The vehicle wheel is connected by suitable mechanical means with a conventional or existing gear box 11 which responds to the rotary motion of the wheel to drive a shaft at a suitable rate. The gear box 11 is normally connected to a speedometer 12 in most vehicles. Normally, a flex-cable extends from the speedometer 12 to the gear box 11. A relatively stiff drive member transfers rotation from the gear box 11 to the speedometer 12. The present invention embodies a cable take-off 13 installed at a convenient point between the gear box 11 and speedometer 12 to provide a rotary motion likewise proportional to the flexable input to the speedometer 12. The take-off 13 is a conventional device and functions as a drive device for a pulse generator 14. The mechanical connection from the takeoff 13 to the pulse generator 14 may have several forms. One suitable form of pulse generator is the use of a magnet which is rotated in proximity of a pick-up coil. As the magnet passes the pick-up coil, a pulse is formed in the coil. This technique forms a train of pulses from the pulse generator 14 to the signal conditioner 15. The signal conditioner 15 forms appropriate signals in response to the pulse train for a speed detector 16. The speed detector 16 provides a suitable output signal to a means as will be described hereinafter for indicating to others the speed of the vehicle. Moreover, the output means typically includes lights visible to other vehicles and a speed controller of suitable nature such as a governor or the like. Additionally, a receiver 17 responds to a set point transmitter 18 for transmitting a signal to the apparatus which may provide an overriding speed limit from a remote location. For instance, the set point transmitter 18 can be installed adjacent the roadway and operated in such a manner as to lower the speed limit as the traffic volume increases or as bad weather conditions demand. More will be noted concerning this alternation hereinafter.

Figures 2, 3, 4:
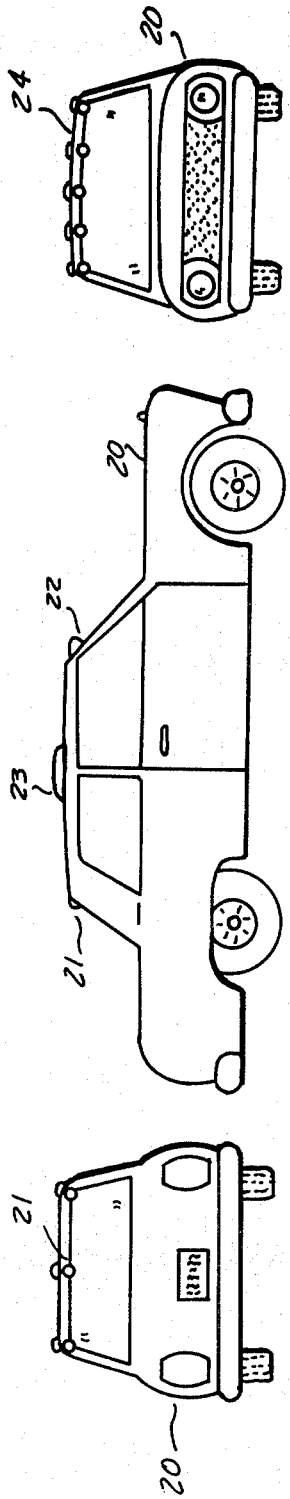
FIG. 2 is a rear view of an automobile illustrating one location of the indicating apparatus of the vehicle.
FIG. 3 is a side view of an automobile showing the apparatus located for indication fore and aft.
FIG. 4 is a front view of an automobile showing an alternative indication apparatus.

Attention is next directed to FIGS. 2, 3 and 4 which show the location of the apparatus on a vehicle. In FIG. 2, a vehicle indicated by the numeral 20 is viewed from the rear. The present invention embodies indicator lamps which are preferably mounted high on the vehicle at 21. The indicator lamps are preferably coded in the following manner. Acceptable colors for the lamps are yellow, green and red, arranged in a predetermined order across the vehicle. While the order is not pertinent for the present disclosure, the arrangement should be consistent so that the device may be read by an observer. Preferably, the lights are mounted above the rear window at the roof-line of the vehicle. If desired, the indicators can actually be located on the top or roof of the car, as necessary. The lamps should be of suitable size, perhaps fifty watts or better. The lens installed over the lamps should be at least two or three inches in diameter, the increased power and lens diameter forming an indicator which can be seen at a great distance. Since it is desirable to provide indicators which are visible at distances of several thousand feet, the need for power and size will be appreciated.

On considering the fact that vehicles operating at high speeds approaching one another often close the distance at a rate of perhaps 200 feet per second, suitable reaction time requires optimum visibility and to this extent, the present apparatus is preferably visible at a distance of perhaps 2,000 feet or so. Of course, during inclement weather conditions, such as rain or fog, the visibility is decreased, but by the same token, the operating speed of the vehicle is likewise decreased so that the interval of time provided by the early warning apparatus is adequate for the driver.

In FIG. 3, the vehicle 20 is shown in side view wherein one location for the lamps is indicated at 21 on the rear of the vehicle, and the forward facing location is shown at 22. Alternative location on the roof of the car is shown at 23. For purposes of contrast, the arrangement shown in FIG. 2 utilizes three lamps, and the arrangement of FIG. 4 shows five lamps at 24. Different coding techniques are permitted by a change in the number of lamps; one suitable arrangement is the use of yellow and red lights at the outboard locations, with the three central lamps being green. Again, the lamps are preferably of adequate power, and the lens diameter is preferably substantial so that visibility is not impaired to a remote observer.

Attention is next directed to Table 1, which is arranged for the three lamp indicator means shown in FIG. 2. The table shows the operative conditions of the lamps in a selected code which represents the vehicle speed in the following manner. The symbols in the table represent the yellow, green and red lamps in the vertical columns. The speed of the vehicle is shown in increments or brackets of 10 mph. Through the use of binary coding, eight speed brackets are made available. A ninth is obtained by the use of flashers on all of the indicators as will be described. Thus, all of the lamps are off for speeds ranging from 0 to 9 mph. This is shown in Table 1 wherein the off condition is indicated by zero entered in the row opposite the 0-to-9 mph speed indication. As the speed of the vehicle progresses through the various brackets, the condition of the lamps is altered between the off and on in an exclusive code to thereby indicate speed within the various brackets or ranges. All indicator lights are on in the last speed range of 70-to-79 mph as indicated by the chart. At speeds exceeding 80 mph, all of the lamps are visible and flashing, this to indicate an over-speed and consequently dangerous condition. Of course, the speed brackets may be altered or varied as may be desired. For instance, the use of the eight speed ranges derived from a three indicator system adapts itself for set points in brackets of less than 10 mph per bracket.

In Table 2, different codes are available for a five lamp arrangement. A binary progression will be recognized in Table 1 while Table 2 can use an arbitrary code as selected. One such arbitrary code is shown in Table 2. With more indicators available, the speed brackets are reduced and the quantity increased. The advantage of this is shown in Table 2 wherein the third, fourth and fifth operative conditions are limited to ranges of only 5 mph. These ranges are particularly helpful since most city driving is in the range of perhaps 20-to-30 mph, and brackets of 10 mph might be considered too coarse. At any event, Table 2 indicates the operative condition of the lamps. The smaller increments yield a more precise indication at or near the town and country speed limits. Many states have a speed limit of 30 and 65 mph. Table 2 is arranged to indicate over-speeding by blinking all of the indicators. Should the maximum speed limit of a given state be different, the various set points of Table 2 can be altered accordingly.

Attention is next directed to FIG. 5 which is a representative panel of the apparatus including the controls and indicators for the driver. The panel is indicated generally by the numeral 25 and includes indicator lamps 26, 27 and 28. The lamps are preferably coded in the same manner as the lamps carried near the top of the vehicle, and are wired in parallel to provide the same indication to the operation. Additionally, a low speed control 29 and high speed setting 30 are made available to the operator. Multi-position switches are adapted for setting in low and high speeds desired for the vehicle. For instance, should the vehicle be on a limited access highway with minimum and maximum speed limits of perhaps 40 and 60 mph, the lower speed limit is set at the control 29 and the control 30 is set to 60 mph. Through the use of the controls 29 and 30, a suitable speed range for the vehicle is controlled by the operator for his convenience and safe operation.

Suitable indicator lamps 31 and 32 indicate the speed of the vehicle as being under or over the set points provided by the controls 29 and 30. Should the vehicle be out of the desired range, one of the two lamps will light. Should the vehicle be within the desired range, both are extinguished and the operator has an indication that he is within the speed limits which he has himself set by the controls 29 and 30. More will be noted hereinafter concerning the cooperation of the controls 29 and 30 with the set point apparatus to be described.

In FIG. 6, a more complete schematic of digital apparatus is illustrated. The take-off 13 is mechanically connected with the pulse generator 14 in a manner to generate the pulses which are input to the counter 15. The counter is re-set periodically by a gate generator 34 which operates at a timed rate. For example, the gate generator 34 may reset the counter 15 once every second. The number of pulses stored in the counter 15 is dependent in large part on certain constant factors in the apparatus preceeding the counter 15 such as the various gear ratios and the like. The counter 15 accumulates a count which is periodically input to a decode matrix 35.

The decode matrix 35 responds to various count levels in the counter 15 to set a register 36. Preferably the register 36 stores three bits for cooperation with the three indicator light arrangements shown in FIG. 2. In accordance with Table 1, the three lamps are operated in binary sequence indicative of speeds within the various speed brackets. The register 36 is reset in response to the gate generator 34 as it resets the counter 15.

Should the counter 15 store a count exceeding the count corresponding to the maximum speed, this is indicated through the decode matrix 35 to the register 36 in the formation of an overflow signal on a conductor 37. The conductor 37 connects with a flasher unit 38 which operates the speed display lamps 21. The lamps 21 derive appropriate signals from the register 36 to a set of lamp drivers 39 for turning the lamps off and on. In practice, the lamp drivers 39 are simply coupling amplifiers or relays communicating the register 36 with the speed display lamps 21. The flasher unit 38 can be any suitable means such as a thermal relay or the like which interrupts the complete circuit illuminating the various indicators 21.

A set point control unit 40 is preferably responsive to the controls 29 and 30 shown in FIG. 5. Three bit digital words outside the range determined by the low and high speed set points provide a signal to a speed indicator means 41. The means 41 preferably incorporates an audio and visual indicator such as a blinking light and buzzer or bell for attracting the attention of the driver. It is made responsive to minimum and maximum values, and preferably discriminates against either minimum or maximum alarm conditions. That is, a separate indicator or lamp or the like is provided for speeds which are too slow, and a second indicator or lamp is provided for speeds which exceed the maximum of the set point control unit 40. The units cooperating together provide a suitable indication inside the vehicle to the operator to control his speed. If desired, a conductor indicated at 42 communicates alarm signals to the flasher unit 38 for operating the externally located flashers. Since this is an alternative input to the flasher means 38, it is an optional feature which operates the lamps in the blinking mode on exceeding the set point control unit 40.

The foregoing describes a digital apparatus responsive to pulses having a frequency proportional to speed. Typically, at zero speed, the pulse rate is zero. At higher speeds, the pulse rate increased proportionately so that the quantity transferred from the counter through the matrix appropriately operates the indicator lamps in the manner described. By way of comparison, attention is directed to FIG. 7 which shows circuitry responsive to an analog signal to operate the same output lamps. Considering first the circuitry shown in FIG. 7, the take-off apparatus 13 is communicated with rotary motion proportional to the speed of the vehicle, such as the gear box 11 in a manner previously discussed. The take-off 13 communicates with a DC signal converter 50 which is operative in the following manner. The take-off 13 forms a rotative movement wherein the angle of rotation is proportional to speed. The speedometer found in most vehicles is such a device, and is adapted for this purpose. For instance, installation of a potentiometer having a wiper arm movement driven by the needle movement of the speedometer is a converter which converts angular rotation to DC potential. Since such apparatus can take many embodiments, and since it is further believed well known in the art, it is sufficient to indicate same by block representation in FIG. 7. At any event, a suitable DC voltage having a range corresponding from zero speed to some maximum speed is input to a suitable amplifier means 51.

The amplifier 51 provides suitable impedance and voltage matching between the DC source 50 and a plurality of comparators indicated by the numerals 52 – 59, inclusive. The comparators are similar except their set points are varied to the selected speed brackets. By way of example, brackets having a span of 10 mph are shown in the preferred embodiment of FIG. 7. Each comparator responds to the input signal to devise an indication that the input signal is within the limits determined by the comparator connected thereto. Since voltage comparator circuits are well known, it is believed unnecessary to further describe the comparators used with the present invention. The significant point is that the comparators are provided for the selected speed ranges identified by the indicator means. Thus, the comparators coincide with the speed ranges permitted in Tables 1 and 2, depending on the state speed laws and the like.

As with many comparators, care should be taken to prevent ambiguities wherein one comparator is turned on before an adjacent comparator is turned off, and again, means are known in the art for installation with comparators to prevent such concurrences.

The various comparators drive a decode matrix 60 which is then connected to the indicating means 62. The means 62 again preferably incorporates a register such as the register 36 shown in FIG. 6, suitable lamp drivers such as coupling amplifiers for converting the signal to a suitable voltage at suitable current rates for operation of the externally located lamps which thereby indicate the speed of the vehicle to observers remote from the vehicle.

The comparator 59 forms a signal when speeds in excess of eighty mph are achieved, again assuming use of speed ranges such as those shown in Table 1. On exceeding the 80 mph speed limit, the comparator 59 provides a signal which the decode matrix 60 utilizes to turn on the flasher unit 38. The flasher unit 38 causes the lamps of the outside display means 62 to blink in the manner described hereinbefore.

The numeral 64 indicates the set point control unit which derives an input from each of the various comparators to thereby set maximum and minimum speeds for the vehicle. Again, a visual-audio alarm means 64 is preferably incorporated with set point control and forms an alarm signal for the vehicle operator. If desired, the alarm 65 is connected to the flasher means 38 for operating the indicating means viewed externally of the vehicle in the manner described hereinbefore.

Attention is next directed to FIG. 8 of the drawings. In FIG. 8, the mechanical take-off 13 is communicated with the pulse generator 14 in the same manner as described hereinbefore. A switch 70 communicates a calibration means 71 with the counter 15. As noted before, the pulse generator forms a procession of pulses for the counter 15. When the switch 70 is operated to the normal position, the pulse generator 14 is enabled. On the other hand, operation of the switch 70 to the calibrate terminal connects the calibrator 71 to the counter 15. The calibrator generates a procession of pulses at a precise rate. For instance, a stable oscillator or the like can be used as a calibration source. Other calibration devices are well known in the art, and include, by way of example, and not limitation, mechanically stabilized oscillators, synchronous motors driving appropriate pulse generators, and so on.

The calibrating means 71 is used to verify accuracy of the apparatus. The embodiment shown in FIG. 8 is particularly adapted for use with digital systems as described hereinbefore as shown in FIG. 6, which illustrates the preferred embodiment. By way of contrast, FIG. 7 shows the preferred embodiment of an analog system. Calibrating arrangements for the analog circuitry are shown in FIG. 9.

The gear box 11 is communicated with the take-off 13 which is normally connected to the DC converter 50. The converter 50 is input to the amplifier 51 as shown in FIG. 7. In the arrangement of FIG. 9 wherein calibration is accomplished, the calibrating means 72 preferably incorporates a motor having a controlled or variable speed in response to operation of a calibrated potentiometer. Such devices are known in the art, and suitable variations thereof may be adapted for the present device. In any event, the variable speed motor is mechanically connected to the DC converter 50 to generate a voltage proportional to the motor speed. In simulating the speed of the vehicle, the calibration means 72 is substituted for the mechanical linkage between the wheel of the vehicle and the take-off 13 which is temporarily disconnected from the DC converter 50. The arrangement of FIG. 9 is used to calibrate the analog data system described as one alternate embodiment.

Attention is next directed to FIG. 10 of the drawings. In FIG. 10, a central computer 80 provides a set point control signal to a conventional transmitter 18. The transmitter 18 is positioned and located to beam transmitted signals to a portion of roadway or general area in which the speed of cars is controlled by the computer 80. In an overall traffic control system, the transmitter 18 is made responsive to set point control from a central computer as one technique of system or area-wide traffic control. The device 18 transmits to a receiver 17 which is preferably placed on the vehicle. The receiver 17 and the transmitter 18 are schematically represented herein because the devices are well known in the art.

The vehicle-borne receiver 17 inputs its signal to a suitable decode or demodulate unit 83. The transmitter 18 can transmit PCM code, FM, AM, or any other signal format desired. The receiver 17, in cooperation with the decoding means 83, provides a suitable set point signal to a set point control unit 84. The means 84 is quite analogous to the set point control means 40 shown in FIG. 6 with the difference that the means 84 functions automatically and does not require hand operation. Again, it is believed that one skilled in the art will appreciate and understand how to construct the means 84 without a detailed disclosure thereof. The means 84 inputs the signal to the control unit speed indication system, indicated by the numeral 85. The means 85 is the remainder of the apparatus shown in FIG. 6 or 7, which is required to operate the indicating lamps on the vehicle. Since FIGS. 6 and 7 have been given substantial description hereinbefore, it is believed that the means 84 and 85 are well understood based on the foregoing disclosures.

In operation, the means of FIG. 10 may determine that rush hour traffic conditions require a maximum speed of 50 mph. A signal corresponding to this is transmitted by the means 18 to the receiver 17. The receiver 17, in cooperation with the remainder of the circuitry, sets a maximum of 50 mph for the vehicle. On exceeding the speed limit, the apparatus shown in prior views provides the over-speed signal or indication to the vehicle operator.

At times other than rush hour, the central computer 80 may determine that safe and expeditious operating speeds for vehicles subject to its control is 70 mph. In this event, a different signal is transmitted from the transmitter 18 and is received by the vehicle apparatus. The vehicle apparatus responds to the transmitted set point signal, and determines a new maximum speed which is then used by the driver as his maximum speed. With this arrangement, the speed limits are adjusted in accordance with dynamic conditions best observed and controlled by the use of central computer installations, a trend that is presently growing in all large cities. Thus, the present apparatus is adaptable for use not only with fixed or posed highway speed limits, but also adaptable for centrally controlled traffic areas in which dynamic conditions determine certain variables with a view of expediting traffic safety.

The foregoing has been discussed in the form of a binary indicating apparatus. That is to say, the external indicators have only two conditions each, that of being either off or on. Once the condition is determined, the lights or lamps are viewed by an observer who reads the binary function encoded in the indicating means. To date most people have a sufficient understanding of binary codes to read and appreciate the speed indicated by the present invention. Moreover, the present invention assumes cooperation with the various safety agencies, such as the ICC, and the various state regulatory bodies. In accordance with the needs of the various regulatory agencies, it might be desirable to adapt different indicating means from those discussed in the present invention. While this choice is left to the agencies, it is believed that the present disclosures is directed to a novel means whereby speed indications are yielded for the operator himself and for all who might observe his vehicle, whether near or far. This is particularly valuable for safety purposes and is quite useful for common carriers which cover substantial mileage in each vehicle annually. While other modifications are available, the scope of the present invention is determined by the scope of the claims appended hereto.

What is claimed is:

1. A speed indicating device for indicating the speed of the device externally of the vehicle, comprising:
    a. source means for forming an analog signal encoding therein the speed of the vehicle over at least a predetermined range;
    b. a first voltage comparator connected to said source means;
    c. a second voltage comparator connected to said source means;
    d. said first and second comparators each forming an output signal indicative of a comparison of the speed of the vehicle with a present level associated with each of said comparators, the said comparators having different preset levels; and
    e. lamp means adapted to be mounted on such a vehicle and adapted to form a visible indication in a manner as to be seen from externally of the vehicle, said lamp means being operated in a predetermined pattern to indicate speed of such a vehicle on connection with said comparators in relation to the preset levels thereof.

2. The invention of claim 1 wherein the preset level of
    said first comparator corresponds to a first speed, the preset level of said second comparator corresponds to a second speed, and said lamp means changes indications as the speed of such a vehicle passes through the first and second speeds.

3. The invention of claim 1 wherein an indication of speed of such a vehicle is desired in X increments over a range of speeds Y and the number of said comparators is $X + 1$ and each of said comparators has as a preset level one of the speeds corresponding to one of the end points of the X increments and including the end points of the Y range.

4. The invention of claim 1 wherein said source means forms a DC voltage level proportional to speed of such a vehicle.

5. The invention of claim 4 wherein said voltage level is compared by said comparator means with a reference voltage.

6. The invention of claim 1 wherein said lamp means include at least a pair of lamps adapted to be mounted externally of such vehicle, said lamps being operated either on or off, and said predetermined code being a binary code.

7. The invention of claim 1 wherein said lamp means are adapted to be mounted at a position on such vehicle as to be observed externally and rearwardly of such a vehicle.

8. The invention of claim 1 for installation on a typical vehicle in which some portion rotates at a speed proportional to vehicle speed wherein said source means include a mechanical take-off means connected to the rotating portion and a voltage generating means coupled to said take-off means for forming an analog signal dependent on the rotational speed.

9. The invention of claim 1 further including a flasher means connected to said lamps for causing same to yield a flashing signal indicative of over-speed, and means responsive to the analog signal in excess of a predetermined value to initiate operation of said flasher means on over-speeding of the vehicle.

* * * * *